US011840641B2

(12) United States Patent
Rakshit

(10) Patent No.: US 11,840,641 B2
(45) Date of Patent: Dec. 12, 2023

(54) REPAIR STRUCTURE CRACKS USING SELF-MOVING FILLER MATERIALS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 16/939,014

(22) Filed: Jul. 26, 2020

(65) Prior Publication Data

US 2022/0025191 A1   Jan. 27, 2022

(51) Int. Cl.
*E01C 11/00* (2006.01)
*C09D 5/00* (2006.01)
*C09D 7/61* (2018.01)
*E04G 23/02* (2006.01)
*H01F 1/44* (2006.01)
*H01F 7/20* (2006.01)
*C09D 163/00* (2006.01)
*C09D 5/34* (2006.01)

(52) U.S. Cl.
CPC ............... *C09D 5/00* (2013.01); *C09D 5/34* (2013.01); *C09D 7/61* (2018.01); *C09D 163/00* (2013.01); *E04G 23/0211* (2013.01); *H01F 1/44* (2013.01); *H01F 7/20* (2013.01); *C08K 2201/01* (2013.01)

(58) Field of Classification Search
CPC ..... E01C 11/005; E04G 23/0203; H01F 1/44; H01F 7/20
See application file for complete search history.

(56) References Cited

U.S. PATENT DOCUMENTS

| 7,939,154 B2 | 5/2011 | Fosnacht et al. |
| 9,022,696 B2 | 5/2015 | Wiedenmann |
| 9,230,921 B2 | 1/2016 | Ayotte et al. |
| 10,830,544 B2 * | 11/2020 | Joshi ........... F28F 19/06 |
| 10,882,751 B2 | 1/2021 | Shahsavari et al. |
| 11,198,978 B1 * | 12/2021 | Rakshit ........... E01C 23/0973 |

(Continued)

FOREIGN PATENT DOCUMENTS

| CN | 114396022 | * | 4/2022 |
| WO | 2019128045 A1 | | 7/2019 |

OTHER PUBLICATIONS

"Magnetic pulse welding," Wikipedia The Free Encyclopedia, Printed Jan. 2, 2020, 4 pages https://en.wikipedia.org/wiki/Magnetic_pulse_welding.

(Continued)

*Primary Examiner* — Gary S Hartmann
(74) *Attorney, Agent, or Firm* — Rachel M. Yadlosky

(57) ABSTRACT

A method and apparatus for automatically repairing structure cracks. The method may include mixing a filler material with ferromagnetic dust to create a filler material mixture. The method may also include storing each filler material mixture in a filler material reservoir. The method may also include creating an array of magnetic coils in the structure, where the array of magnetic coils creates a magnetic path through the structure. The apparatus may include a structure. The structure may include a plurality of filler material reservoirs, wherein each filler material reservoir stores a filler material mixture. The structure may also include an array of magnetic coils inside the structure.

20 Claims, 8 Drawing Sheets

(56) References Cited

U.S. PATENT DOCUMENTS

| | | | |
|---|---|---|---|
| 11,208,351 B2* | 12/2021 | Yu | C04B 20/0036 |
| 11,543,322 B2* | 1/2023 | Parker, IV | G01M 3/226 |
| 2018/0087224 A1 | 3/2018 | Jeoffroy et al. | |
| 2019/0039952 A1 | 2/2019 | Elam | |
| 2020/0332483 A1 | 10/2020 | Michiharu et al. | |

OTHER PUBLICATIONS

Snoeck et al., "Self-healing of concrete," Ghent University, Department of Structural Engineering and Building Materials, Printed Jan. 2, 2020, 4 pages https://www.ugent.be/ea/structural-engineering/en/research/magnel/research/research3/selfhealing.

"UK's first major trial of self-healing concrete gets underway in Wales," PHYS ORG, Cardiff University, Oct. 28, 2015, 3 pages, https://phys.org/news/2015-10-uk-major-trial-self-healing-concrete.html.

Rakshit, "Repair Structure Cracks Using Self-Moving Filler Materials," U.S. Appl. No. 16/939,016, filed Jul. 26, 2020.

List of IBM Patents or Patent Applications Treated as Related, Dated Jul. 23, 2020, 2 pages.

\* cited by examiner

REPAIR STRUCTURE CRACKS USING SELF-MOVING FILLER MATERIALS

BACKGROUND

The present disclosure relates to filler materials for cracks in structures, and more specifically, to repairing cracks in structures by automatically transferring filler materials along a magnetic force pathway inside the structures.

Structures (such as buildings, bridges, machines, etc.) require periodic maintenance in order to maintain the structure. As structures age, weather, shift, etc., cracks may start to develop on the surface. To fill the cracks, and help maintain the structure, filler materials may be used. Filler materials may include any material used to fix the crack(s). Examples of filler material may include calcium carbonate, silica, epoxy resins (i.e., polyepoxides), any other resins, plastic, adhesive material, etc. In some instances, the filler materials may be viscous materials (e.g., a viscous fluid) so that, when filling the crack, the filler materials may mold into the shape of the crack and therefore completely fill the entire crack in the structure.

SUMMARY

Various embodiments are directed toward a method of automatically repairing cracks in a structure. The method may include mixing a filler material with ferromagnetic dust to create a filler material mixture. The method may also include storing each filler material mixture in a filler material reservoir. The method may also include creating an array of magnetic coils in the structure, where the array of magnetic coils creates a magnetic path through the structure.

Additional embodiments are directed to an apparatus for repairing cracks in a structure. The apparatus may include a structure. The structure may include a plurality of filler material reservoirs, wherein each filler material reservoir stores a filler material mixture. The structure may also include an array of magnetic coils inside the structure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
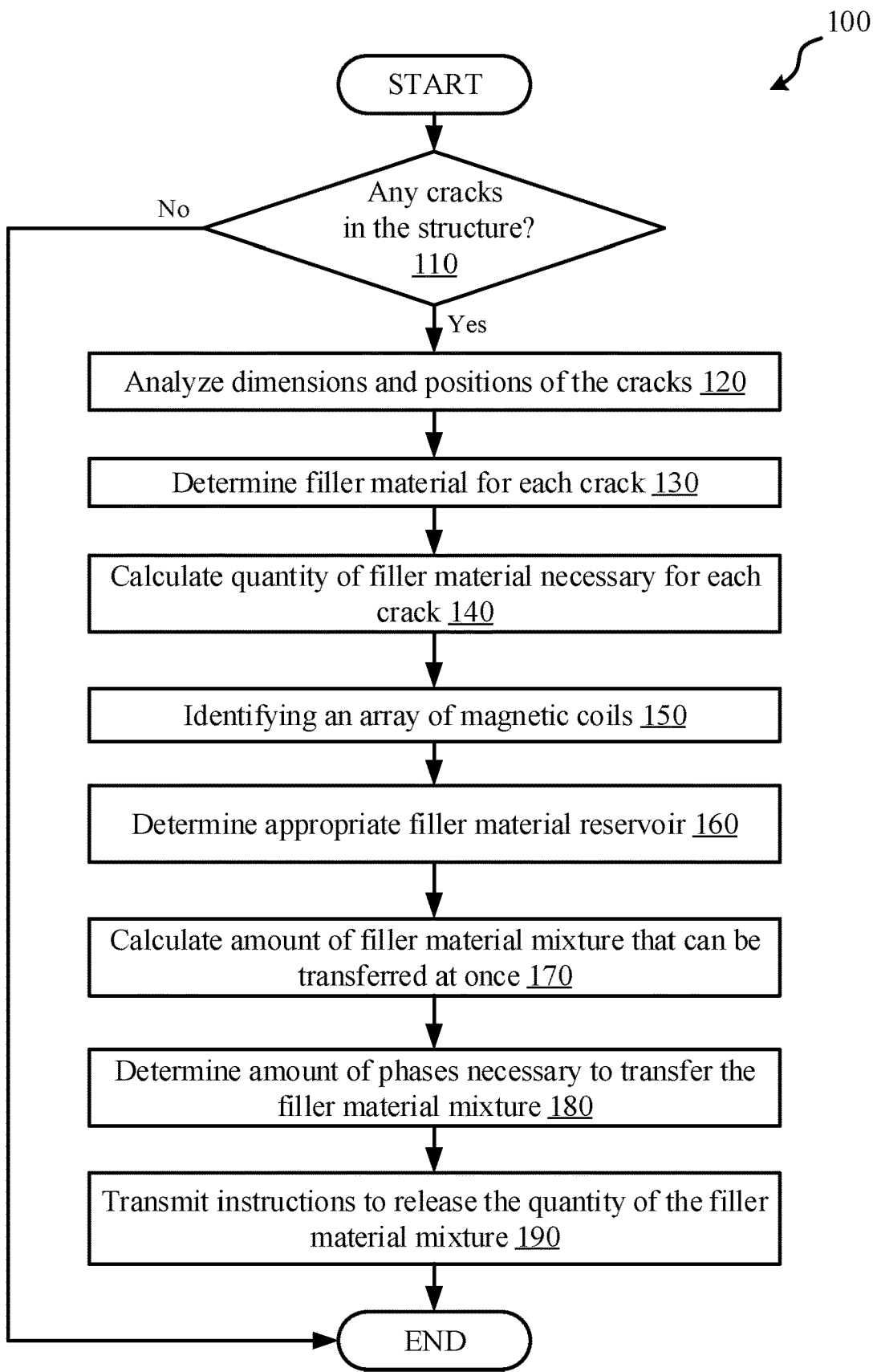
FIG. 1 depicts a flowchart of a set of operations for releasing filler material mixture from an appropriate filler material reservoir to fill a crack in a structure, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to filler materials for cracks in structures, and more specifically, to repairing cracks in structures by automatically transferring filler materials along a magnetic force pathway inside the structures. While the present disclosure is not necessarily limited to such applications, various aspects of the disclosure may be appreciated through a discussion of various examples using this context.

In various structures (such as buildings, bridges, machines, etc.), periodic maintenance is required to make sure that there are no cracks in the structure. Cracks may include a split, crevice, gap, hole, opening, chunk, etc. in the structure. Cracks, as used herein, typically have a negative impact (even if small) on the structural integrity of the structure, and are typically not included in the original design of the structure. If any cracks are identified, the cracks may need to be corrected in order to maintain the structure and keep it intact. To correct the crack, a filler material may be applied around the crack area in order to fill the crack and correct the defect in the structure.

In some instances, a three-dimensional (3-D) printing machine may be used to help lay the filler material around the crack area. For instance, the 3-D printing machine may print a material layer by layer until the crack is filled. However, some structures may be too complex for machines (such as the 3-D printing machine) to access in order to fix the structure. For example, if there is a crack on the inside of a pipe, the diameter of the pipe may be too small to allow for direct access to the pipe. In another example, a crack may be near the top of a tall building (for example, a skyscraper), in a location not easily accessible by, for instance, a 3-D printing machine. Further, these crack locations may not be accessible by humans in order to manually fill the crack(s).

The present disclosure provides a computer-implemented method, system, and computer program product to repair cracks in structures by automatically transferring filler materials along a magnetic force pathway inside the structures. In some instances, the filler material may travel through the structure to the crack in the structure. In some embodiments, the filler material travels on a surface of the structure to the crack in the structure. The filler material may automatically move along a magnetic path of magnetic fields (for example, created using metal coils and/or magnets) via magnetic forces. The filler material may include ferromagnetic particles (particles with a high susceptibility to magnetism, which may also have strong magnetism properties) in order to automatically move along with the magnetic forces and/or fields. Examples of ferromagnetic particles may include iron particles, cobalt particles, nickel particles, etc.

The filler material may be stored in various reservoirs along the structure. In some instances, different types of filler material are stored in different reservoirs. For example, a building may have bricks on the bottom portion of the building, but concrete or cement on the top portion. Filler material(s) compatible with the brick may be stored in reservoirs near the brick areas of the structure and filler material(s) compatible with the concrete/cement may be stored in reservoirs near the concrete/cement areas of the structure.

Once a crack has been identified in a structure, a filler material that is compatible with the area in which the crack is located may be identified, and then the filler material reservoir (that stores the specific filler material) that has the best access to the crack in the structure may also be identified. A magnetic path may then be established between the reservoir and the structure and the filler material may be released from the reservoir in order to automatically travel along the magnetic pathway (for instance, via magnetic forces/fields). The magnetic pathway may lead the filler material to the crack in the structure.

In some instances, the filler material may be transferred in stages in order to maintain the intended movement. For example, too much filler material at once may cause the filler material (or at least some of the filler material) to move in a direction different (in some instances, opposite from) the direction of the magnetic force. In this example, breaking up the filler material into multiple stages (e.g., transferring half of the filler material in one stage and the second half of the filler material in a second stage) may maintain filler material movement in the same direction as the magnetic force.

In some embodiments, when filling a crack in the structure, the filler material can adjust its shape to the crack in the structure, therefore filling the entire crack. Once the crack is filled, the filler material may harden/solidify to fix the crack. In some instances, localized heat may be applied to the filler material (once in the crack of the structure) in order to solidify the filler material. In some instances, a curing agent may be applied to help solidify the filler material.

By automatically transferring filler materials along a magnetic force pathway, cracks in the structure may be automatically filled without any human interference. In addition, hard to access cracks (for example, a crack on the inside of a small pipe or a crack on the top of a building) may be accessible through the magnetic force paths. Therefore, an increased amount of cracks in buildings may be filled and fixed.

Referring now to FIG. 1, a flowchart illustrating a method 100 for releasing a filler material mixture from an appropriate filler material reservoir in order to fill a crack in a structure is depicted, according to some embodiments. In some embodiments, method 100 is executed by a server (e.g., computer system/server 802 (FIG. 8)) on or connected to a computer system (e.g., computer system 410 (FIG. 4), computer system 710 (FIG. 7), and/or computer system 800 (FIG. 8)). In some embodiments, the method 100 is implemented as a computer script or computer program (e.g., computer executable code) to be executed on or connected to the computer system. In some embodiments, the computer system is on or connected to a system within a structure.

Method 100 includes operation 110 to determine, or identify, whether there are any cracks in the structure. In some embodiments, one or more sensors and/or camera devices may be located at various spots on (or near) the structure. These sensors/cameras may monitor and scan the structure to locate any cracks in the structure. In some embodiments, the sensors and/or camera devices are Internet of Things (IoT) devices that may transfer the data feeds that are gathered of the structure to the computer system. Identifying cracks in the structure may include receiving data feeds of the structure from the one or more IoT devices. The data feeds may include any visual data (e.g., images, videos, etc.) along with any other data relating to the structure and its current physical status.

In some embodiments, once the data feeds are received from the IoT devices, the data feeds are analyzed. Analyzing the data feeds may include breaking down and searching the data feeds for any indication of a crack, or cracks, on/in the structure. For example, if the data feeds are visual data feeds, analyzing the data may include breaking down the feeds frame by frame and searching each frame for any images (or other visuals) of cracks to the structure.

In some embodiments, a structure may have a plurality of cracks in the structure. In some embodiments, a structure may have a single crack. In some embodiments, no cracks may be located in the structure. If it is determined that there are no cracks in the structure, in operation 110, method 100 may end.

If one or more cracks are identified in the structure in operation 110, method 100 may proceed to operation 120 to analyze the dimensions and positions of each of the one or more cracks. Once it is determined that a crack, or cracks, in the structure exist, the crack(s) may be analyzed to determine their size, location, etc. In some embodiments, the data feeds (e.g., sensor feeds, camera feeds, etc.) received from the IoT devices (discussed above) may be used to determine dimensions and positions of each crack in the structure. The dimensions of the crack in the structure may include the length, width, depth, etc. In some embodiments, the dimension of the crack in the structure is the size of the crack in the structure. The positions of the crack(s) may include the location in the structure where the crack, or cracks, are located. In some embodiments, the position of the crack may include coordinates of the location of the crack. In some embodiments, the position of the crack may include a location of the crack corresponding to the structure. For example, the position of the crack may be that the crack is located in the top right corner of the structure.

Method 100 includes operation 130 to determine a type of filler material for each of the one or more cracks. The determining may be based on the analyzing (in operation 120). In some embodiments, once it is determined where and how big the crack(s) in the structure are (put differently, the position and location of each crack in the structure), an appropriate filler material for each crack may be determined. For instance, a crack that is located on a pipe may use a different filler material than a crack that is located on a brick on a building.

In some embodiments, determining the type of filler material for each of the one or more cracks in the structure may include identifying one or more materials of the structure in an area surrounding each of the one or more cracks. This may be done, in some instances, using the data feeds from the IoT devices. For example, a crack may be located in a brick of a building, so the materials of the structure in the area surrounding the crack may be brick and cement. In some embodiments, the area may be a pre-determined area (for example, a number of square feet) surrounding the crack in the structure. In some embodiments, the area may include the parts of the structure that immediately surround the crack. For example, if the crack is located on a brick of the structure, without overlapping the cement at all, the area may just be the brick itself, as the brick immediately surrounds the crack in the structure. The materials in the area surrounding the crack in the structure may be identified for each crack in the structure, in some instances. For example, if there are five cracks in the structure, material(s) in the area surrounding the crack in the structure may be separately identified for each of the five cracks.

In some embodiments, determining the type of filler material for each of the one or more cracks in the structure includes determining a type of crack in the structure for each of the one or more cracks in the structure. In some embodiments, the types of cracks in the structure may be based on how the crack is formed. For instance, different causes of cracks may result in different types of cracks, such as shrinkage cracks, expansion cracks, heaving cracks, settling cracks, etc. Shrinkage cracks may occur when the materials of the structure shrink. In some instances, shrinkage cracks may be narrow in width (for example, the distance between the structure material on either side of the crack is small) and, in some instances, may extend over larger areas of the structure. For example, if the structure is brick, a shrinkage crack may extend over an entire brick (or even multiple bricks), instead of only a small portion of the brick. Expansion cracks may be larger in width and, in some instances, may have additional cracks located near the original expansion cracks. In some instances, expansion cracks extend over smaller areas of the structure (for example, over a corner of a brick). Heaving cracks, in some embodiments, may include multiple connecting cracks. In some instances, heaving cracks are caused by the structure material heaving (or lifting up and settling back down), which may cause multiple cracks (in some instances, connecting to each other) throughout an area of the structure. Settling cracks may occur when the material of the structure settles. In some embodiments, settling cracks include cracks located at a seam of the material (for example, at concrete seams between bricks).

In some embodiments, determining the type of crack in the structure may include comparing images of the crack(s) in the structure (for example, from the data feeds from IoT devices) to historical data (such as past images) of cracks and their types. The type of crack in the structure, based on the historical data, that is most similar to the current crack in the structure may be selected as the type of crack in the structure. In some embodiments, a type of crack in the structure is determined for each crack in the structure.

In some embodiments, determining the type of filler material for each of the one or more cracks in the structure includes determining a best-fit filler material for each of the one or more cracks in the structure. This determination may be based on at least the one or more materials of the structure, the type of crack in the structure, and the dimensions and positions of each of the one or more cracks in the structure. For example, if the structure (or at least the portion of the structure that the crack is located) is made of a smooth metal material, some filler materials may have a hard time sticking to the structure and staying in place. Therefore, in this example, the best-fit filler material may be an adhesive material because the adhesive material may stick to the smooth metal material of the structure. In some embodiments, the materials of the structure, the type of crack in the structure, the dimensions of the crack in the structure, and the position of the crack in the structure may all be considered (for example, weighted) when calculating/determining the type of filler material for the crack in the structure. In some embodiments, block 130 may be repeated for every crack in the structure. A machine learning algorithm may be used to determine the best-fit filler material, in some embodiments. In some instances, each crack in the structure has a different best-fit filler material. In some instances, one or more of the cracks in the structure have a same best-fit filler material.

Method 100 includes operation 140 to calculate a quantity of filler material mixture necessary for each of the one or more cracks. A filler material mixture may include the filler material (i.e., a material to fill the gap/crack in the structure) and ferromagnetic particles, in some embodiments. The ferromagnetic particles may help the particles travel along a magnetic path (with magnetic forces) due to the magnetic particles mixed in with the filler material. In some embodiments, the calculating is based on at least the analyzing (in operation 120). The analyzing may also be based on the determining (in operation 130), in some embodiments. Using the dimensions of the crack in the structure, it may be calculated how much (e.g., a volume of) filler material is necessary to fill the entire crack. In some embodiments, as different filler materials have different densities, viscosities, etc., the type of filler material may be considered when calculating how much filler material is necessary.

Method 100 includes operation 150 to identify an array of magnetic coils near the crack. In some embodiments, the structure includes one or more arrays of magnetic coils. The arrays of magnetic coils may be inside the structure, but near the surface(s) of the structure, in some instances. The array of magnetic coils may create a magnetic path (of magnetic fields and magnetic forces) that may move the filler material to the crack in the structure. Therefore, in some embodiments, identifying an array of magnetic coils near the crack may include identifying an array of magnetic coils with magnetic paths that may intersect (or magnetic paths that may cause the filler material to intersect) the crack in the structure.

In some embodiments (discussed further herein), the array of magnetic coils may be an electromagnet, with electric currents being sent through the coils. The electric currents may cause magnetic fields and magnetic forces, which then may establish the magnetic path that may move the filler material mixture to the crack in the structure. In some instances, method 100 includes creating the magnetic path to the crack. The magnetic path may be created by transmitting instructions to send electric currents through the metal coils of the array of magnetic coils (therefore, creating the magnetic fields and forces that are the magnetic path).

In some embodiments (discussed further herein), the array of magnetic coils include a permanent magnet with a metal (e.g., magnetic) material coiled around the permanent magnet. The permanent magnet may create the magnetic path and the metal material coiled around the permanent magnet may strengthen the magnetic forces and fields, therefore strengthening the magnetic path.

Method 100 includes operation 160 to determine an appropriate filler material reservoir connected with the structure for each of the one or more cracks. In some embodiments, the filler material reservoirs are within the structure. In some embodiments, the filler material reservoirs are on a surface of the structure. In some embodiments, some filler material reservoirs are on a surface and some filler material reservoirs are within the structure. Each filler material reservoir may store a filler material and/or a filler material mixture (with the filler material mixed with ferromagnetic particles). Various filler material reservoirs may store different filler materials, in some instances.

In some embodiments, determining the appropriate filler material reservoir within the structure includes identifying one or more filler material reservoirs with the type of filler material for each of the one or more cracks. If some filler material reservoirs store different filler materials, the filler material reservoirs that store the specific filler material type needed to fill the specific crack may be identified. This way, a filler material reservoir that stores the wrong filler material mixture (for the specific crack) may not be selected. In some embodiments, identifying one or more filler material reservoirs with the specific type of filler material (corresponding to the crack) may be repeated for each crack in the structure.

In some embodiments, determining the appropriate filler material reservoir includes determining, for each of the one or more cracks in the structure, which filler material reservoir from the one or more filler material reservoirs is closest to a corresponding crack. The filler material reservoir closest to a crack in the structure may be the filler material reservoir that has the nearest location to the crack in the structure. In some embodiments, the closest filler material reservoir is the closest reservoir that is above the crack, so that both gravitational forces and magnetic forces may be used to automatically move the filler material to the crack. In some embodiments, the appropriate filler material reservoir for a crack in the structure is the filler material reservoir with the appropriate filler material that is closest (or nearest) to the crack.

Figure 2:
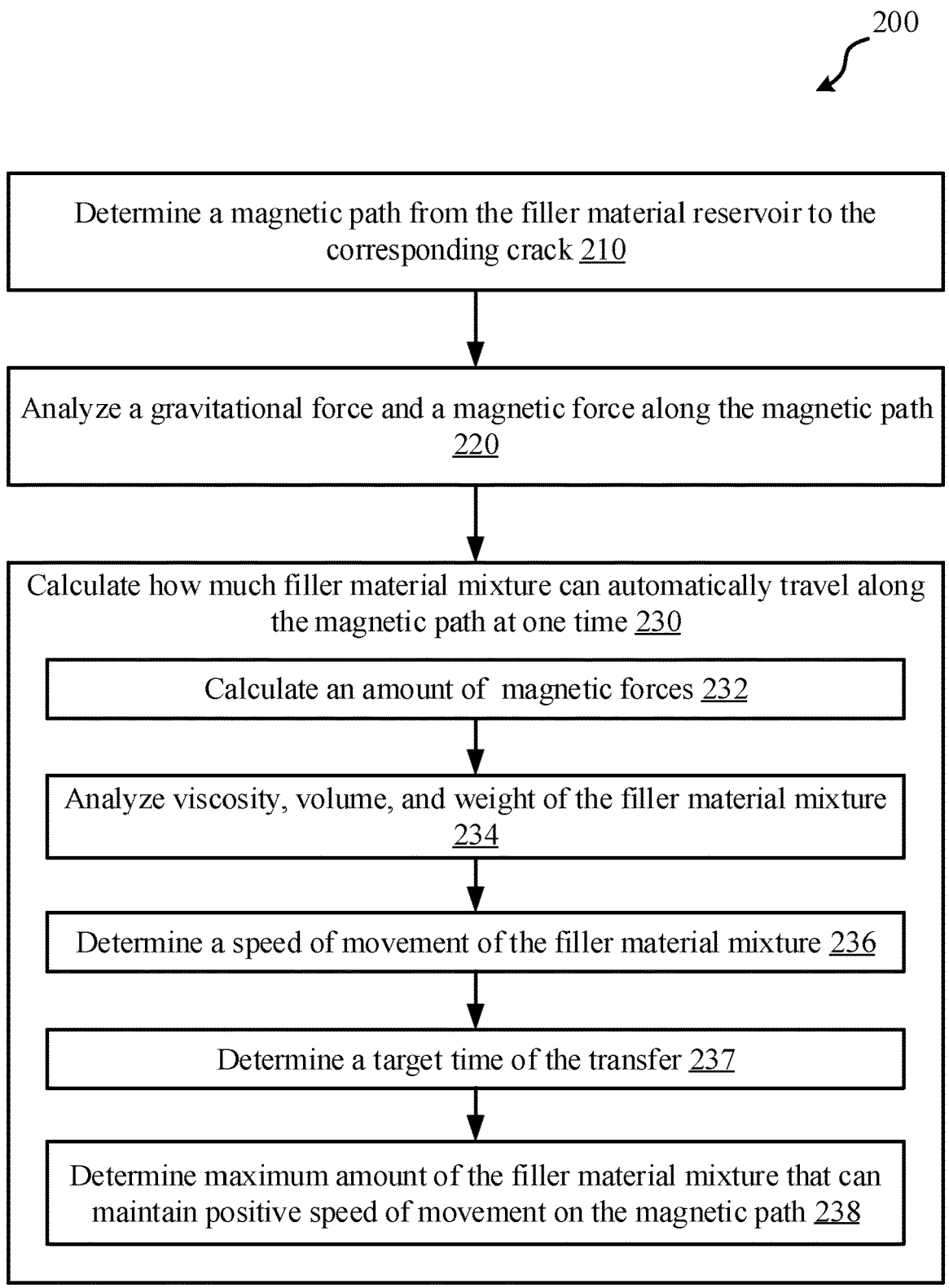
FIG. 2 depicts a flowchart of a set of operations for determining an amount of filler material mixture that can be transferred at one time, according to some embodiments.

Method 100 proceeds to operation 170 to, in response to determining the appropriate filler material reservoir for each of the one or more cracks, calculate an amount of filler material mixture that can be transferred at once. As discussed herein, the filler material may be a viscous fluid (even a semi-solid fluid, in some instances). Therefore, the filler material mixture may remain, at least partially, clumped together in instances where the filler material may be transferred within a certain period of time. The certain period of time may be referred to as a target time. The target time may be an amount of time in which the transfer takes place. For example, the transfer of the filler material may take place over the course of an hour or two. In some embodiments, the target time is determined by a user. In some instances, the magnetic forces that help automatically move the filler material mixture from the reservoir to the crack in the structure may not be strong enough to carry the entire amount of filler material necessary to fill the crack in the structure at one time. In some embodiments, the amount of filler material that can be transferred at once, or at one time, may be the amount of filler material that can be transferred over the target time. Therefore, the amount of filler material mixture that can be transferred at one time from the reservoir to the crack in the structure may be determined. For example, if the filler material is to be transferred over a target time of 30 minutes, the filler material mixture may stay together (instead of spreading out along the surface of the building) and the magnetic forces may only be able to transfer half of the total amount of filler material mixture during those 30 minutes. Calculating the amount of filler material mixture that can be transferred at one time is further discussed herein and is depicted in FIG. 2.

Method 100 includes operation 180 to determine an amount of phases necessary to transfer the quantity of filler material mixture to each of the one or more cracks. The amount of phases necessary to transfer the filler material mixture to the crack in the structure may be the amount of times filler material will need to be transferred, in order to move the entire amount of filler material necessary to fill the crack in the structure to the actual crack in the structure. To determine the amount of phases necessary, the amount of filler material mixture that can be transferred at once (from operation 170) and the quantity of filler material necessary for each crack (from operation 140) may be used. In some instances, dividing the quantity of filler material necessary for a crack in the structure by the amount of filler material that can be transferred at once (for that specific crack in the structure) may determine the amount of phases necessary to transfer the full quantity of filler material mixture to the crack in the structure. In some embodiments, an amount of phases is determined for each different crack in the structure.

Method 100 includes operation 190 to transmit instructions to release the quantity of the filler material mixture from the appropriate filler material reservoir connected with the structure for each of the one or more cracks. In some embodiments, the instructions may simply include how much (i.e., the quantity) of the filler material mixture to release from the filler material reservoir. In some embodiments, the instructions may include the amount of filler material that can be transferred at once (and directions to only release this amount of filler material mixture at a time) as well as the amount of phases necessary to transfer the filler material mixture to the crack in the structure.

For example, 1500 mL (or 1.5 L) of filler material mixture may be necessary to fill a crack in the structure. In this example, only 500 mL of filler material mixture may be able to be transferred at once (in order to automatically move along the magnetic path). Therefore, in this example, there may need to be three phases of the 500 mL amount of filler material mixture in order to transfer the entire amount of filler material mixture necessary to fill the crack in the structure. The transmitted instructions may include instructions for the filler material reservoir to release a total of 1.5 L of filler material mixture, but to release the material in three phases of 500 mL amounts of filler material. In some instances, the instructions may also include a time to release each phase of filler material. Continuing the previous example, the instructions may also include an instruction to wait 30 seconds between each 500 mL release (or, put differently, to release a phase with the 500 mL of filler material mixture every 30 seconds).

In some embodiments, the instructions are transmitted to a computer system that controls the filler material reservoirs. In some embodiments, the computer system performing method 100 also controls the filler material reservoirs. Therefore, in some instances, the instructions may be transmitted to a component of the computer system that controls the filler material reservoir(s).

In some embodiments, additional instructions to apply localized heat to the filler material mixture at each of the one or more cracks (after the filler material has filled each of the one or more cracks) are also transmitted. The filler material mixture (or at least the filler material within the filler material mixture) may not be a solid when stored in the reservoir and/or when transferred from the reservoir to the crack in the structure. The filler material may be a semi-solid (i.e., highly viscous liquid) material. For example, the filler material (and/or the filler material mixture) may be in a viscous liquid form while being transferred to the crack of the structure and while filling the crack in the structure. This way, the crack may be completely filled, as a liquid may take the shape of its container. Once the crack of the structure is filled, however, it may be necessary for the filler material mixture to solidify, so that it is not displaced from the crack in the structure that it filled. In some embodiments, localized heat may be applied to the filler material mixture in order to help solidify the filler material mixture. For example, a laser, or any other method of applying heat, may be applied to (e.g., aimed at) the filler material mixture once it has filled the crack in the structure. The heat from the laser, or any other method of applying heat, may cause the filler material mixture to solidify and harden, therefore treating the crack in the structure. In some embodiments, in order for the heat to be applied to the filler material mixture, instructions may be transmitted to a computer system controlling the laser, or any other method of applying heat.

In some embodiments of the present disclosure that are not depicted in FIG. 1, method 100 may proceed from operation 160 to operation 190. In other words, once the type of filler material, quantity of filler material mixture, and appropriate filler material reservoir have been determined, instructions to release the necessary amount of filler material mixture from the appropriate filler material reservoir may be transmitted. With an array of magnetic coils, the various magnetic fields of each magnetic coil in the array may interact with each other. The interaction of magnetic fields may cause magnetic forces throughout the magnetic path (of the array(s) of magnetic coils). The ferromagnetic dust mixed with the filler material may also have magnetic fields (due to the magnetism from the ferromagnetic particles). The magnetic fields of the filler material mixture may interact with the magnetic fields of the magnetic coils, which may further cause magnetic forces throughout the magnetic path.

Analyzing the magnetic force(s) along the magnetic path (and the array of magnetic coils) may include analyzing the magnetic fields along the array of magnetic coils, determining the movements of the magnetic fields, and determining the magnetic forces (and the movements of the magnetic forces) based on the movements of the magnetic fields.

Gravitational forces may also be acting on the magnetic path (and the array of magnetic coils), as well as on the filler material mixture when it is transported along the magnetic path. In some embodiments, analyzing the gravitational forces (i.e., forces due to gravity) may include determining a relation between the direction of the gravitational forces and a direction of the magnetic forces. In some embodiments, the gravitational forces may be acting in a similar direction as the magnetic forces. In some embodiments, the gravitational forces may be acting in an opposite direction as the magnetic forces.

Method 200 includes operation 230 to calculate, based on the gravitational force and the magnetic force, how much filler material mixture can automatically travel along the magnetic path at one time. The magnetic forces and gravitational forces may be acting on the filler material mixture and may guide the movement of the filler material mixture along the magnetic path. In some embodiments, when the magnetic forces and gravitational forces are moving in a similar direction, both forces may be helping guide the movement of the filler material mixture. In some embodiments, when the magnetic forces and gravitational forces are moving in opposite directions, the magnetic forces may be helping guide the movement of the filler material mixture in one direction and the gravitational forces may be trying to move the filler material mixture in a different direction (for example, away from the crack in the structure).

In some embodiments, calculating how much filler material mixture can automatically travel along the magnetic path at one time may include operation 232 to calculate an amount of the magnetic forces on the magnetic path. As discussed herein, the interaction of the magnetic fields caused by the array of magnetic coils may cause magnetic forces along the magnetic path. To calculate the amount of the magnetic forces, the computer system may calculate the magnitude of magnetic force(s) acting on the magnetic path, along with the direction of the magnetic forces. In some embodiments, as the magnetic forces may be continuously moving, the amount of the magnetic forces may be calculated using the velocity of the particles and the magnetic fields (for example, using the Lorentz force law).

In some embodiments, calculating how much filler material mixture can automatically travel along the magnetic path at one time may include operation 234 to analyze at least a viscosity of the filler material mixture, a volume of the filler material mixture, and a weight of the volume of the filler material mixture (for instance, when the filler material mixture is a viscous fluid, such as a semi-solid mixture). In some embodiments, the volume of the filler material mixture corresponds to the quantity of filler material mixture necessary to fill the crack in the structure. The quantity of filler material mixture necessary may be measured by volume (e.g., centimeters cubed ($cm^3$), liters (L), etc.). In some embodiments, the quantity of filler material mixture necessary may be converted to a volume of filler material mixture. The weight of the filler material mixture may be determined using the volume of the filler material mixture and a density of the filler material mixture, in some embodiments. The viscosity of the filler material mixture may be how thick the filler material mixture is (for example, when the filler material mixture is a liquid). In some embodiments, the filler material is a viscous fluid. The viscous fluid may be a liquid, so that the filler material mixture may completely fill the crack in the structure, but the higher viscosity of the viscous fluid may prevent the filler material mixture from flowing out of the crack in the structure before the filler material mixture solidifies into place. The viscous material, in some instances a highly-viscous semi-solid material, may remain clumped together during the transport from the filler material reservoir to the crack in the structure due to the viscosity of the material. Therefore, determining and analyzing the weight of the filler material mixture may help determine how much of the filler material can be transported at one time.

In some embodiments, the magnetic forces (and gravitational forces) are only able to carry a certain amount of filler material mixture at one time. When the gravitational forces are acting in a direction opposite the magnetic forces, the magnetic forces may be able to carry an even smaller amount of filler material mixture at one time. To determine how much filler material mixture can be carried at once, the size/amount of filler material that will need to be carried may be analyzed. When analyzing the amount of filler material, at least the volume and weight of the filler material mixture may be analyzed. Additionally, the movability, or how easily the filler material mixture moves, may also be analyzed when determining how much filler material can be carried at once. The viscosity of the filler material mixture may be used to determine how easily the filler material moves, in some instances. For example, the higher the viscosity of the filler material mixture (i.e., the thicker the filler material mixture), the more difficult it may be to move the filler material mixture. Thinner filler material mixtures may be easier to move along the magnetic path.

In some embodiments, calculating how much filler material mixture can automatically travel along the magnetic path at one time includes operation 236 to determine, based on the calculating and analyzing (of operations 232 and 234, respectively), a velocity of the filler material mixture on the magnetic path. The velocity of the filler material mixture may indicate the speed and direction of movement of the filler material mixture on the magnetic path. The gravitational forces, magnetic forces, volume of the filler material mixture, distance from the filler material reservoir to the crack in the structure, etc. may all be considered/used when determining the velocity of the filler material mixture. In some embodiments, a positive velocity indicates that the filler material is travelling in the same direction as the magnetic forces. A negative velocity may indicate that the filler material is travelling in an opposite direction as the magnetic forces.

In some embodiments, calculating how much filler material mixture can automatically travel along the magnetic path at one time may include determining a target time of the transfer. As discussed herein, there may be a target time for a transfer to occur. For example, the filler material transfer may occur over 10 minutes, 30 minutes, an hour, etc. During this time period, the filler material mixture may stay at least somewhat clumped together, which may result in the magnetic forces only being able to transfer a certain amount of filler material during the transfer time. In some embodiments, the transfer time is set by a user.

In some embodiments, calculating how much filler material mixture can automatically travel along the magnetic path at one time may include operation 238 to determine a maximum amount of the filler material mixture that can maintain a positive velocity on the magnetic path. In order for the filler material mixture to reach the crack in the structure, the filler material mixture may need to travel in the same direction as the magnetic forces. Therefore, in some embodiments, the velocity of the filler material mixture may need to be positive in order for the filler material mixture to transfer from the filler material reservoir to the crack in the structure.

In some embodiments, determining a maximum amount of the filler material mixture that can maintain a positive velocity may include determining the maximum amount that can maintain a positive velocity during the transfer time. For example, if the transfer time is 15 minutes, the total amount of filler material mixture may not be able to maintain a positive velocity during the 15 minute transfer, as the filler material mixture may be too heavy. But, in this example, a fourth of the total filler material mixture may be able to maintain a positive velocity during a 15 minute transfer. Therefore, in this example, transferring the filler material mixture may include four transfers (each with ¼ of the total filler material mixture) each occurring over a 15 minute span, in order to transfer the entire filler material mixture.

In some embodiments, calculating how much filler material mixture can automatically travel along the magnetic path at one time may also include determining a maximum amount of filler material mixture that can maintain a positive velocity above a threshold velocity on the magnetic path. In some instances, even if a velocity of the filler material mixture on the magnetic path is positive, the velocity may still be low, which may cause the transferring of the filler material mixture to the crack in the structure to be inefficient. In some embodiments, a threshold positive velocity (moving in the direction of the magnetic force(s)) may be predetermined (for example, by a user of the computer system). The threshold velocity may be a velocity of the filler material mixture that maintains an efficiency of transferring the filler material mixture on the magnetic path, in some instances.

In some embodiments, when it is determined that the filler material mixture may take more than one phase to transfer the full quantity of filler material necessary to the crack in the structure, the quantity of the filler material mixture (from the transmitted instructions (for example, transmitted in operation 190 of FIG. 1)) may be the maximum amount of filler material mixture that can maintain the positive velocity on the magnetic path. In some instances, the transmitted instructions may include instructions to release the quantity of the filler material based on the amount of the filler material mixture that can be transferred at one time. This way, the transmitted instructions may include the amount of filler material that can be transferred at once (and directions to only release this amount of filler material mixture at a time) as well as the amount of phases necessary to transfer the filler material mixture to the crack in the structure.

Figure 3:
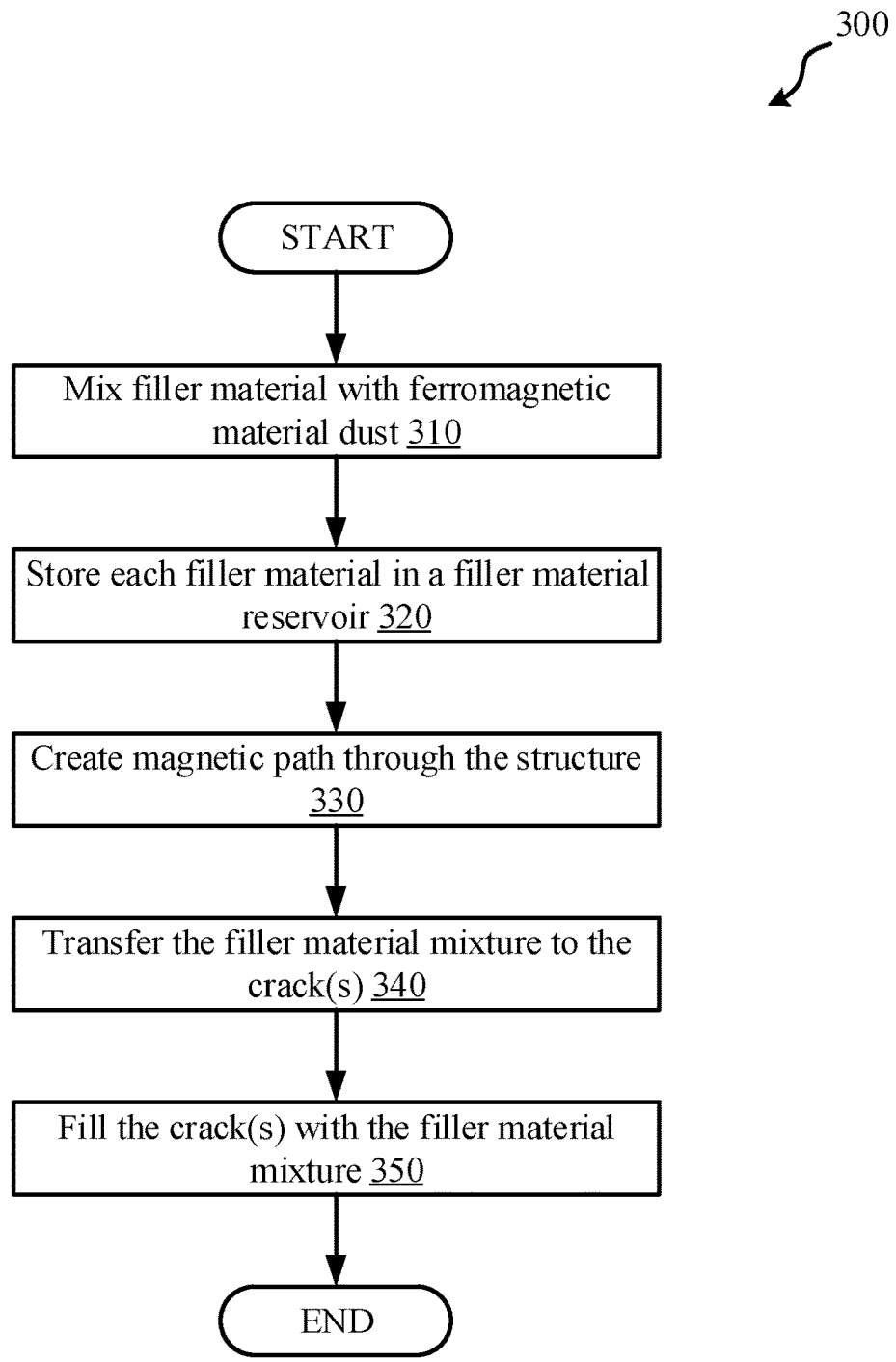
FIG. 3 depicts a flowchart of a set of operations for automatically filling a crack in a structure using a filler material mixture, according to some embodiments.

Referring to FIG. 3, a flowchart illustrating a method 300 for automatically filling a crack in a structure using a filler material mixture is depicted, according to some embodiments.

Method 300 includes operation 310 to mix each filler material with dust of a ferromagnetic material (sometimes referred to herein as "ferromagnetic dust") to create one or more filler material mixtures. Ferromagnetic dust may be small particles of a material with ferromagnetic properties. Materials such as iron, cobalt, nickel, etc. may have ferromagnetic properties. In some embodiments, ferromagnetic dust includes small (dust-like) particles of iron, cobalt, nickel, etc. The mixture of ferromagnetic dust and filler material may be referred to herein as a filler material mixture.

Method 300 includes operation 320 to store each filler material in a filler material reservoir. Various filler material reservoirs may be located on or, in some instances, within a structure. In some embodiments, each filler material reservoir stores a different type of filler material. In some embodiments, filler material reservoirs may store a filler material compatible with the material(s) of the structure that are located near the specific filler material reservoir. For example, a building may have bricks on the bottom portion of the building, but concrete on the top portion. Filler material(s) compatible with the brick may be stored in reservoirs near the brick areas of the structure and filler material(s) compatible with the concrete/cement may be stored in reservoirs near the concrete areas of the structure.

In some embodiments, storing each filler material mixture in the filler material reservoir includes identifying one or more materials of the structure. In the previous example, the materials may be brick and concrete. Storing each filler material mixture may also include determining which material is in an area surrounding the filler material reservoir. One or more filler materials that are compatible with the material of the structure in the area surrounding the filler material reservoir may also be determined. The filler material mixture that includes the filler material compatible with the material of the structure may be stored in the filler material reservoir. This may be repeated for each filler material reservoir on the structure, in some embodiments.

Method 300 includes operation 330 to create an array of magnetic coils from the filler material reservoir to the crack in the structure (so that the filler material mixture may reach each crack in the structure). The array of magnetic coils may form a magnetic path from each reservoir to each crack in the structure, in some embodiments. The magnetic path may automatically transfer the filler material mixture to the crack in the structure. In some embodiments, the filler material reservoirs are located outside, but on a surface of, the structure and the array of magnetic coils are located inside the structure. The array of magnetic coils may be located near each surface of the structure, but inside the structure, so that the magnetic forces of the array of magnetic coils reach the surface of the structure and the filler material mixture can still be moved by the magnetic forces.

In some embodiments, a plurality of magnetic coils may be formed, or created. In some instances, the magnetic coil may be a metal coil (i.e., a metal material in the shape of a coil). In some instances, each coil (e.g., a metal coil) may be wrapped around a magnet in order to form the magnetic coil. The magnets, each with a coil around it, may be lined up next to each other. The magnetic coils may be arranged from end to end to form an array of magnetic coils. In some instances, arranging the magnetic coils may include placing the magnetic coils such that a southern end of one magnet is near, or even touching, a northern end of the next magnet. Opposite forces may attract, so, by forming the array of magnetic coils with opposite ends of the magnet near each other, the opposite ends of each magnet may attract to each other, allowing the magnetic forces from one magnetic coil (with the coil and the magnet) to the next magnetic coil.

In some embodiments, when creating the array of magnetic coils, the filler material reservoir may be the closest (e.g., nearest) filler material reservoir to each of the one or more cracks in the structure. In some instances, a different filler material reservoir may be closest to each of the cracks in the structure. The array of magnetic coils, in some instances, may be the path (of magnetic coils) from the closest filler material reservoir (to the crack in the structure) to the actual crack in the structure. There may be a different array of magnetic coils for each crack in the structure, in some embodiments.

In some embodiments, creating the array of magnetic coils from the filler material reservoir to a crack in the structure (or to each crack in the structure) may include identifying one or more magnetic coils (from the array of magnetic coils) between the filler material reservoir and the crack(s) in the structure. In some instances, there may be only one magnetic coil located between the reservoir and the crack(s). In some embodiments, there are a plurality of magnetic coils located between the reservoir and the crack(s) in the structure.

In some embodiments, creating the array of magnetic coils from the filler material reservoir to a crack in the structure may include releasing the filler material from the filler material reservoir. In some instances, the releasing is done in response to receiving transmitted instructions from a computer system (for example, from operation 190 of FIG. 1). Releasing the filler material may include releasing a quantity of filler material mixture (for instance, identified in operation 140 of FIG. 1) that is necessary to fix the crack in the structure. For example, the filler material reservoir may release just enough filler material mixture to fill the crack(s) in the structure.

In some embodiments, creating the magnetic path from the filler material reservoir to a crack in the structure may include creating looped magnetic currents along the magnetic path. The magnetic path may include an array of magnetic coils. The north and south ends of each magnet (from each magnetic coil) may create closed loops for each magnetic coil. Magnetic forces, caused by the magnetic fields, may run through the closed loop for each magnetic coil. When the magnetic fields and the flow of the magnetic fields change, looped magnetic currents may form. In some embodiments, moving the filler material mixture (with the ferromagnetic particles) through, or next to, the magnetic fields and forces of the magnetic path, creates looped magnetic currents for each magnetic coil. In some embodiments, the looped magnetic currents are Eddy currents.

In some embodiments, the looped magnetic currents move the filler material mixture. For instance, once the filler material mixture is released from the filler material reservoir, the filler material may pass through, or next to, the magnetic forces of the first magnetic coil of the magnetic path. This may change the magnetic fields of the first magnetic coil, due to the ferromagnetic dust in the filler material mixture, and may cause looped magnetic currents in a closed loop around the magnetic coil. Because the filler material mixture has magnetic properties (due to the ferromagnetic particles), the filler material mixture may be attracted to the magnetic forces of the magnetic coils and the magnetic path. Therefore, in some embodiments, the looped magnetic currents, and the motion of the magnetic force, may cause the filler material mixture to move in a direction of the magnetic currents and the magnetic forces.

Method 300 includes operation 340 to transfer the filler material mixture to each crack in the structure. As discussed above, the magnetic currents and the magnetic forces of the magnetic path may move the filler material mixture along the magnetic path. In some embodiments, transferring the filler material mixture may include releasing the filler material mixture from the reservoir and having the filler material mixture automatically transfer, or move, along the magnetic path to the crack(s) in the structure. In some embodiments, the amount of filler material necessary to fill a crack in the structure may be too much for the magnetic forces of the magnetic path to move at one time. The filler material mixture may be a viscous fluid (in some instances, a semi-solid fluid) that remains at least mostly clumped together during the transfer from the reservoir to the crack. The magnetic forces may only be able to move, or transfer, a certain amount of filler material mixture (over an area of the magnetic path) at one time.

Therefore, in some embodiments, transferring the filler material mixture to the crack(s) in the structure may include carrying a first amount of the filler material mixture along the magnetic path. The first amount of the filler material mixture may be an amount, or quantity, of filler material mixture that can be automatically carried along the magnetic path by at least one (or both) of a magnetic force and a gravitational force. In some embodiments, the first amount of the filler material mixture is the amount of filler material mixture that can be transferred at one time that was calculated in operation 170 (FIG. 1).

In some embodiments, transferring the filler material to the crack(s) in the structure includes carrying a second amount of the filler material mixture along the magnetic path. If the filler material mixture to be transferred is a larger quantity that may not be able to be carried at one time, the filler material mixture may be separated into multiple amounts in order to be automatically transferred by the magnetic forces (and possible other forces) along the magnetic path. In some instances, the second amount of the filler material mixture is less than or equal to the first amount.

For example, 750 mL of filler material mixture may be necessary to fill a crack in the structure. In this example, only 500 mL of filler material mixture may be able to be automatically carried along the magnetic path at one time. Therefore, in this example, the first amount of filler material may be 500 mL. The second amount of filler material, however, may be 250 mL, as there are only 250 mL remaining of the initial 750 mL of filler material mixture.

In another example, the magnetic path may only be able to automatically carry 250 mL of filler material mixture at one time (for example, due to a more dense filler material mixture, weaker magnetic forces, stronger gravitational forces moving in the opposite direction of the magnetic path, etc.). In this example, the first amount of filler material mixture may be 250 mL, which leaves 500 mL remaining that needs to be transferred. The second amount of filler material mixture may also be 250 mL (the same as the first amount), as that is the maximum amount of filler material mixture that can be carried by the magnetic path at one time. In this example, a third amount of filler material, again 250 mL, may be required in order to have the entire quantity of filler material mixture transferred to the crack in the structure.

In some embodiments, the filler material mixture may be transferred within the structure. In some embodiments, the filler material reservoirs are located on an outside of the structure and the magnetic path may be located inside of the structure. The magnetic path, though, may be located near enough to the outside of the structure such that the magnetic forces of the magnetic path can be felt on the outside of the structure. This way, the amount (e.g., the first amount) of filler material mixture may be automatically transferred, or carried, by the magnetic forces of the magnetic path along the outside of the structure.

Method 300 includes operation 350 to fill one or more crack in the structure with the filler material mixture. In some embodiments, the magnetic path may lead the filler material mixture directly to the crack in the structure, and the filler material mixture may automatically fill the crack(s) in the structure. For example, when the filler material reservoir is located on the outside of the structure, the filler material mixture may automatically travel along the side of the structure (in the direction of the magnetic forces of the magnetic path) until the filler material mixture reaches the crack in the structure. Once the filler material mixture reaches the crack in the structure, the mixture may fill the crack in the structure. In some instances, the magnetic forces of the magnetic path may continue in the direction of the magnetic path, but the forces may not be strong enough to remove the filler material mixture from the cracks and crevices of the structure that the filler material mixture has now filled.

In some embodiments, method 300 may be executed for each crack in the structure.

Figure 4:
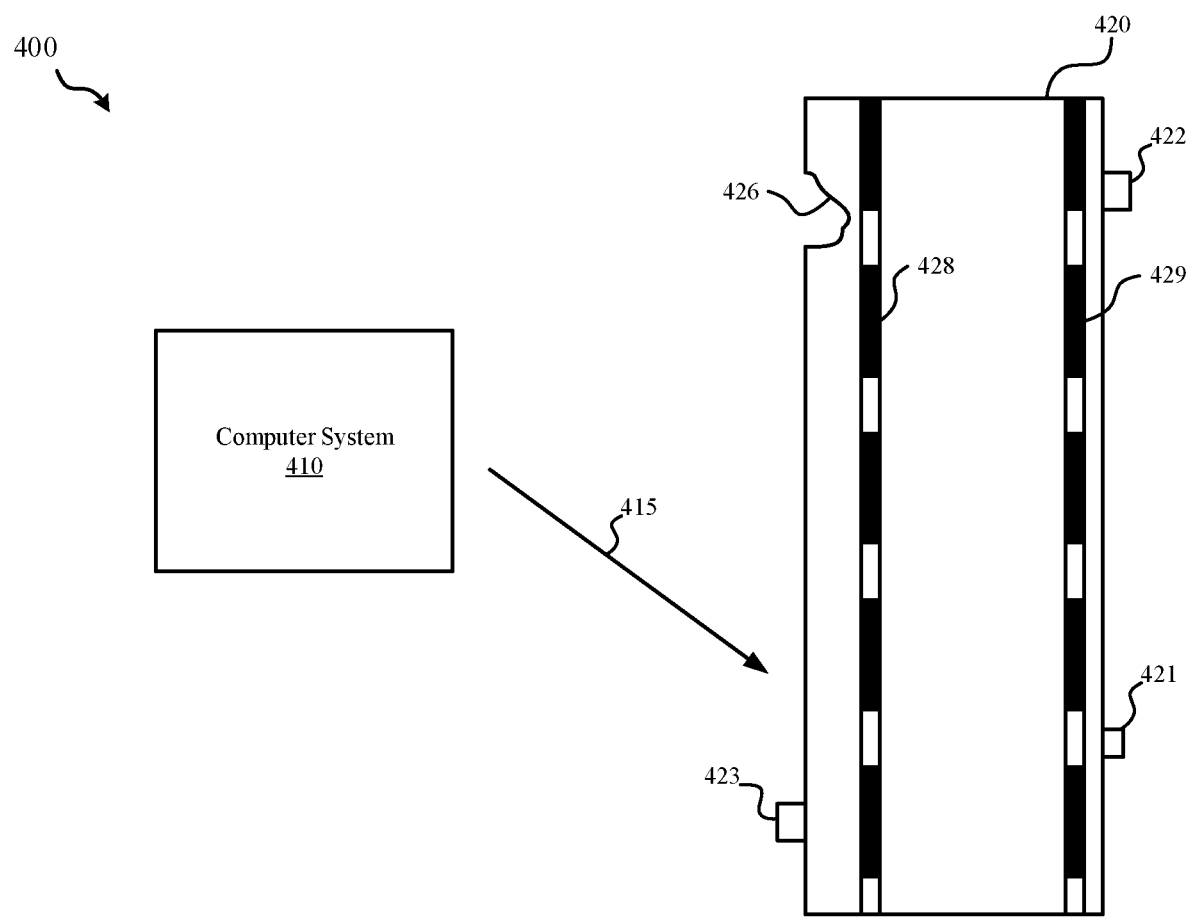
FIG. 4 depicts a schematic diagram of an example repair environment, according to some embodiments.
Figure 7:
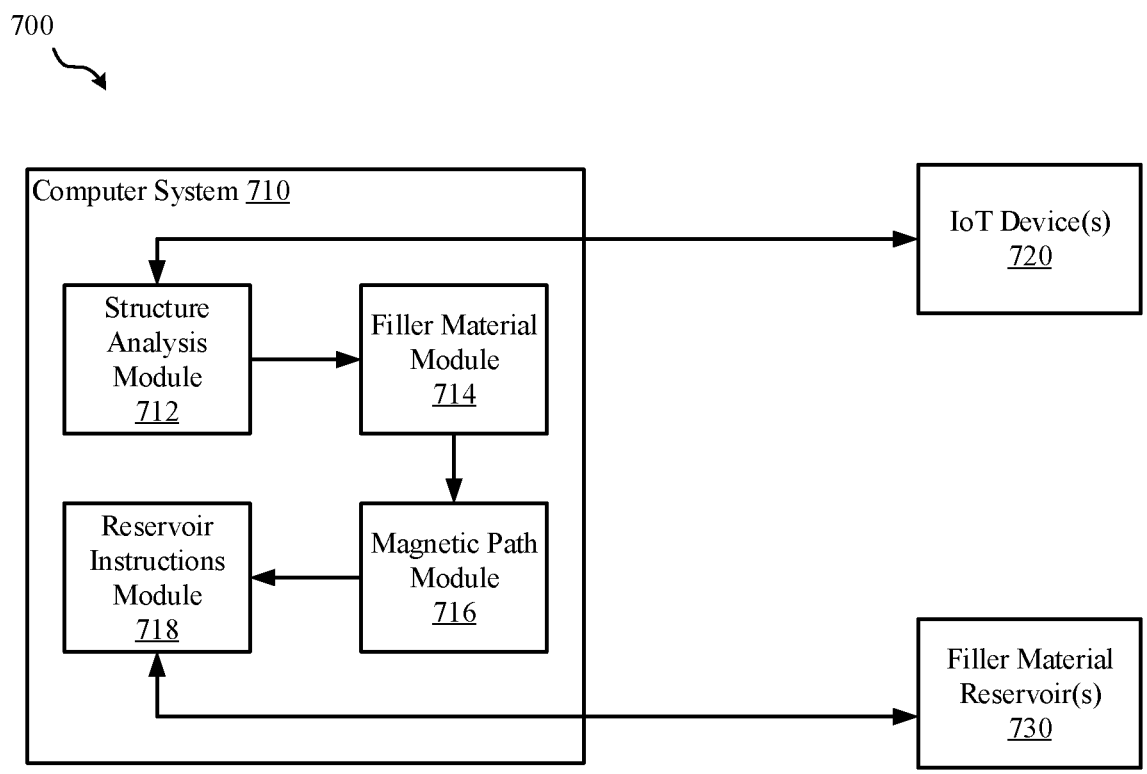
FIG. 7 depicts a block diagram of an example computer system environment, according to some embodiments.

Referring to FIG. 4, a schematic diagram of an exemplary repair environment 400 is depicted, according to some embodiments. The exemplary repair environment may include a computer system 410, and a structure 420. In repair environment 400, the structure may be a building. In some embodiments, computer system 410 executes method 100. The computer system 410 may be discussed further herein and is depicted in FIG. 7.

The structure 420 includes a crack 426 in the structure, as well as filler material reservoirs 421, 422, and 423 on various external surfaces of the structure 420. For instance, in repair environment 400, the filler material reservoirs 421, 422, and 423 may be located on the outside walls of the building structure 420. The structure 420 also includes arrays of magnetic coils 428 and 429. In some embodiments, the arrays of magnetic coils 428 and 429 may be on an outside surface of the structure 420. In some embodiments, the arrays of magnetic coils 428 and 429 may be inside the structure 420, but near the outside of the structure 420.

In repair environment 400, filler material reservoir 423 may be determined (for example, in method 100 (FIG. 1)) to be the filler material reservoir closest to the crack 426 in the structure 420. The computer system 410 may transmit instructions (415) to the filler material reservoir 423 (or a computer system that controls filler material reservoir 423) to release an amount (or amounts) of filler material mixture necessary to fill the crack 426. The filler material mixture may travel along (although separated by the wall of the structure) the magnetic paths created by the array of magnetic coils 428 to the crack 426. In some embodiments, the filler material mixture may travel on an outside surface of the structure 420. Because the crack 426 of structure 420 is located above the filler material reservoir 423, gravitational forces may be moving in a direction opposite the magnetic path and the array of magnetic coils 428. Therefore, in some instances, less filler material mixture may be transferred at one time for the mixture to automatically travel along the magnetic path formed by the array of magnetic coils 428.

In some embodiments, the structure 420 may include one or more sensors (not depicted) on external surfaces of the structure 420. The sensors may scan (for example, using video capabilities) the surfaces of the structure 420 for cracks (e.g., crack 426) in the surface. The sensors may provide information (such as video feeds) about each of the cracks in the structure 420 to the computer system 410.

Figure 5:
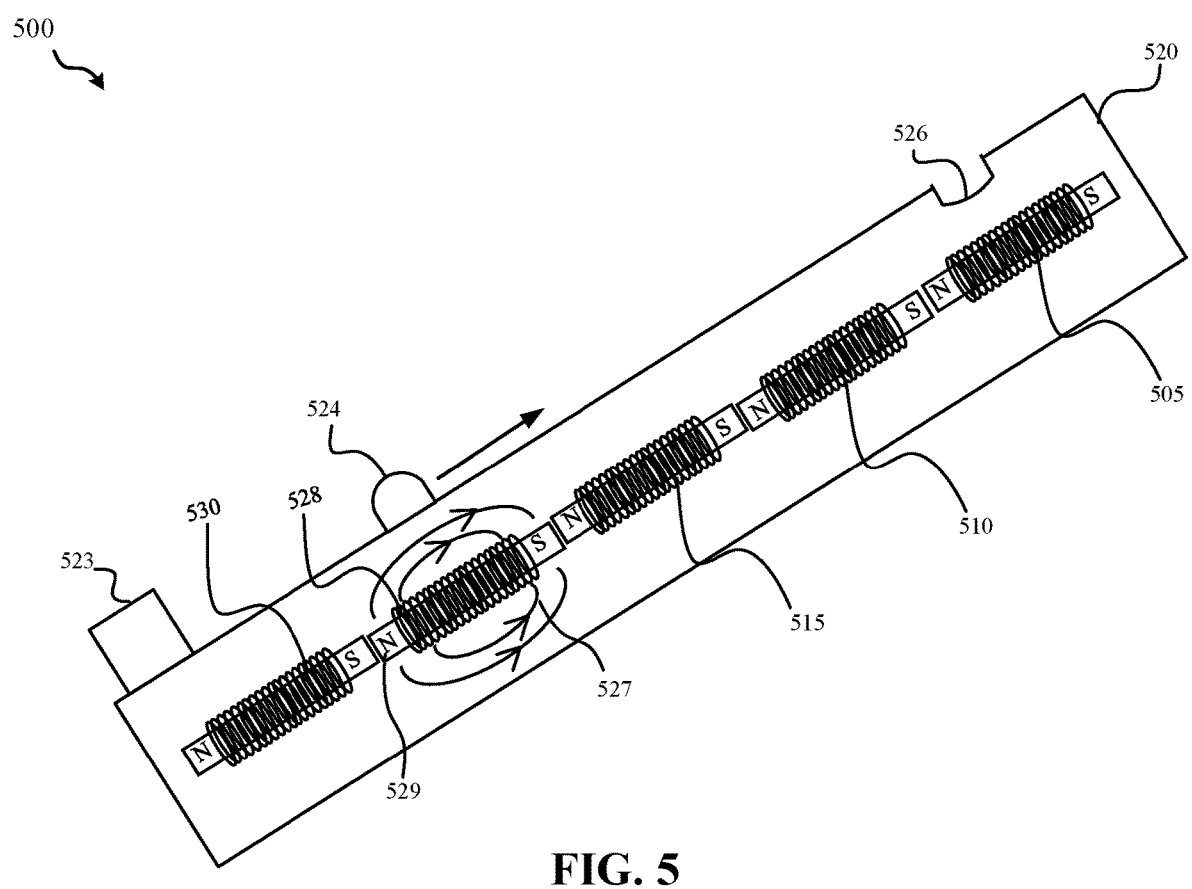
FIG. 5 depicts a schematic diagram of an example structure with a magnetic path from a reservoir to a crack in the structure, according to some embodiments.

Referring to FIG. 5, a schematic diagram of an exemplary structure environment 500 with an array of magnetic coils (that create a magnetic path) from a reservoir to a crack in the structure is depicted, according to some embodiments. Structure environment 500 includes a structure 520 with a crack 526 in the structure. In some embodiments, the structure 520 may have a plurality of cracks in the structure. Structure 520 includes a filler material reservoir 523 that stores filler material mixture. In some embodiments, structure 520 may include a plurality of filler material reservoirs. As illustrated, filler material reservoir 523 is on an outside surface of the structure 520. In some instances, the surface of structure 520 on which filler material reservoir 523 is stored may be selected based on a relationship between the material properties of that structure and the material properties of the filler material. For example, the material of structure 520 may be concrete, and the filler material reservoir 523 may store a filler material mixture that is compatible with concrete. In alternative embodiments not illustrated in FIG. 5, filler material reservoir 523 may be inside the structure 520.

Structure 523 includes an array of magnetic coils inside the structure. The array of magnetic coils may include magnetic coils 505, 510, 515, 528, and 530. In some embodiments, the magnetic coils includes a magnet 529 and a coil 528 wrapped around the magnet 529 (or magnetic material), so that there is a north end of a magnet 529 on one end of the coil 528 and a south end of the magnet 529 at the other end of the coil 528. The array of magnetic coils (including magnetic coils 505, 510, 515, 528, and 530) may create a path from the filler material reservoir 523 to the crack 526 in the structure. In some embodiments, various arrays of magnetic coils may create paths from each filler material reservoir to each crack in the structure. In some instances, each magnetic coil 505, 510, 515, 528, and 530 may form a closed loop of magnetic fields and may be connected with electric current.

On a surface of structure 520, filler material mixture 524 has been released from filler material reservoir 523, and is automatically travelling along the magnetic path of magnetic coils 505, 510, 515, 528, and 530. Filler material mixture 524 may include a mixture of filler material and ferromagnetic dust. The ferromagnetic dust of the filler material mixture 524 may interact with the magnetic forces and magnetic currents of the magnetic coils. For instance, as filler material mixture 524 travels along the magnetic path past magnetic coil 528, looped magnetic currents 527 occur in the closed loop of magnetic coil 528. In some instances, looped magnetic currents 527 may occur on either side of the magnetic coil 528. The looped magnetic currents 527 guide the filler material mixture 524 along the magnetic path towards crack 526. The filler material mixture 524 may eventually reach magnetic coil 505 and then may fill the crack 526 in the structure 520.

Figure 6:
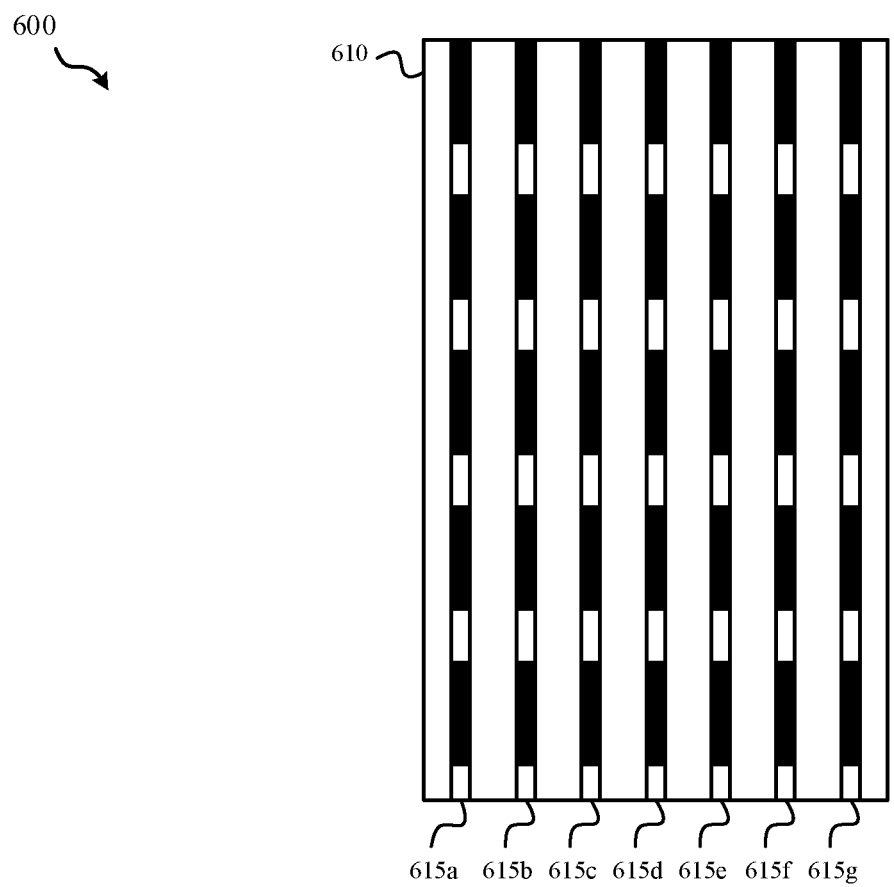
FIG. 6 depicts an example cross-section of a side of the structure, according to some embodiments.

Referring to FIG. 6, an example cross-section 600 of a side of the structure is depicted, according to some embodiments. The cross-section may be one wall, or one side 610, of a structure. The side 610 of the structure may include a plurality of magnetic coils 615*a-g* (referred to collectively as magnetic coils 615). In some embodiments, magnetic coils 615 are located inside the side 610 of the structure, near the outside of the structure. Magnetic coils 615 may be located close enough to each other so that the magnetic forces of at least one magnetic coil 615 may reach each surface of the side 610 of the structure. This way, no matter where on the side 610 of the structure a crack may be located, a magnetic path (created by the magnetic coils 615) may be able to reach the crack in the structure.

Referring to FIG. 7, a block diagram of an exemplary computer system environment 700 is depicted, according to some embodiments. In some embodiments, computer system environment 700 may execute method 100 (FIG. 1). Computer system environment 700 includes a computer system 710, one or more IoT devices 720, and one or more filler material reservoir(s) 730. In some embodiments, computer system 710 corresponds to computer system 410 (FIG. 4) and the filler material reservoir(s) 730 correspond to filler material reservoirs 421, 422, and 423 (FIG. 4). The filler material reservoir(s) 730 may be located on an outside surface (or, in some instances, inside) of the structure. In some embodiments, IoT device(s) 720 are also located on an outside surface of the structure. In some embodiments, IoT device(s) 720 may be located close to, but not on or within, a structure, in order to obtain data (such as videos and/or images) of any cracks in the structure.

Computer system 710 may include multiple components such as a structure analysis module 712, a filler material module 714, a magnetic path module 716, and a reservoir instructions module 718. In some embodiments, structure analysis module 712 may perform at least operations 110 and 120 of method 100 (FIG. 1). Structure analysis module 712 may receive data about cracks in the structure from IoT devices 720. Filler material module 714 may perform at least operations 130, 140, and 160 of method 100 (FIG. 1), in some embodiments. The filler material module 714 may communicate the results of its operations to magnetic path module 716 and, in some embodiments, magnetic path module 716 may perform at least operations 170 and 180 of method 100 (FIG. 1). In some embodiments, reservoir instructions module 718 may execute at least operation 190 of method 100 (FIG. 1) and may transmit instructions to the filler material reservoir(s) 730.

Figure 8:
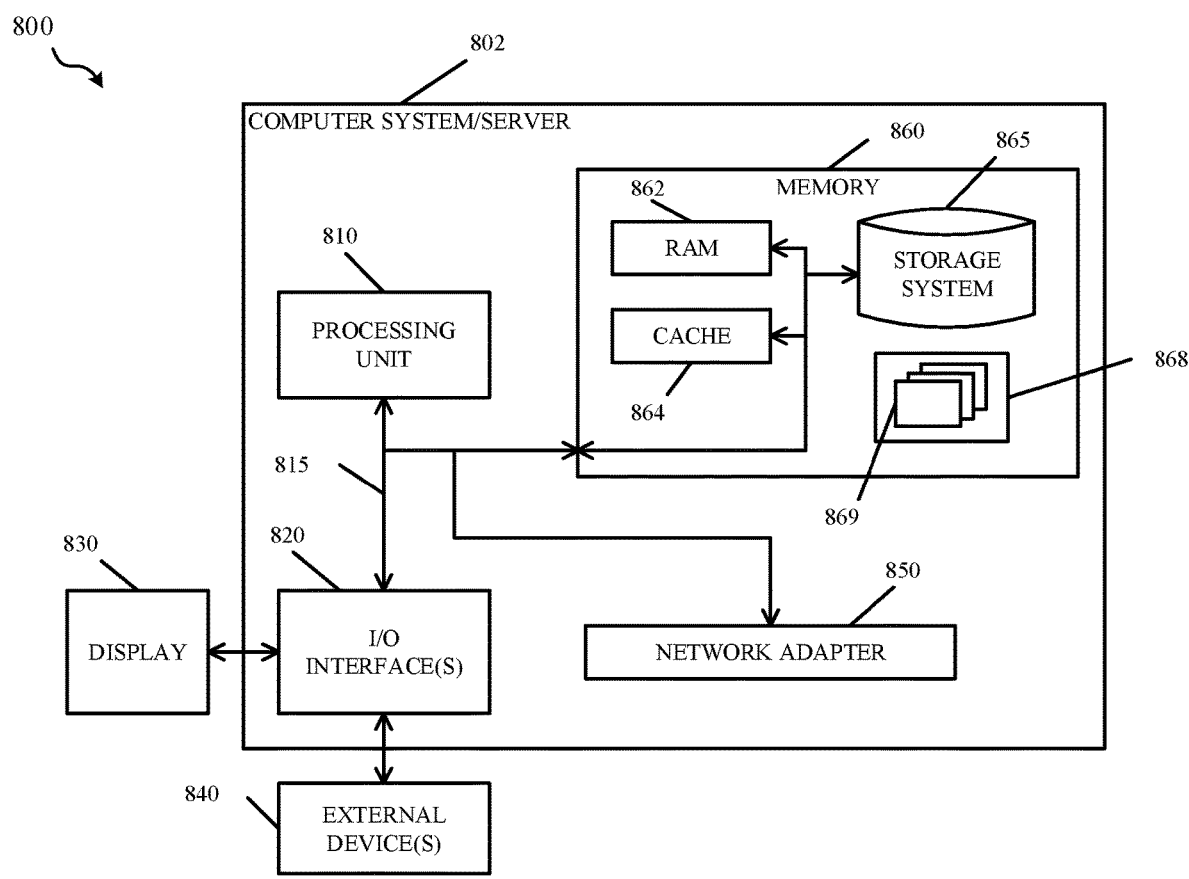
FIG. 8 depicts a block diagram of a sample computer system, according to some embodiments.

Referring to FIG. 8, computer system 800 is a computer system/server 802 is shown in the form of a general-purpose computing device, according to some embodiments. In some embodiments, computer system/server 802 is located on the linking device. In some embodiments, computer system 802 is connected to the linking device. The components of computer system/server 802 may include, but are not limited to, one or more processors or processing units 810, a system memory 860, and a bus 815 that couples various system components including system memory 860 to processor 810.

Bus 815 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 860 can include computer system readable media in the form of volatile memory, such as random-access memory (RAM) 862 and/or cache memory 864. Computer system/server 802 may further include other removable/non-removable, volatile/non-volatile computer system storage media. By way of example only, storage system 865 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces. As will be further depicted and described below, memory 860 may include at least one program product having a set (e.g., at least one) of program modules that are configured to carry out the functions of embodiments of the disclosure.

Program/utility 868, having a set (at least one) of program modules 869, may be stored in memory 860 by way of example, and not limitation, as well as an operating system, one or more application programs, other program modules, and program data. Each of the operating system, one or more application programs, other program modules, and program data or some combination thereof, may include an implementation of a networking environment. Program modules 869 generally carry out the functions and/or methodologies of embodiments of the invention as described herein.

Computer system/server 802 may also communicate with one or more external devices 840 such as a keyboard, a pointing device, a display 830, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 820. Still yet, computer system/server 802 can communicate with one or more networks such as a local area network (LAN), a general wide area network (WAN), and/or a public network (e.g., the Internet) via network adapter 850. As depicted, network adapter 850 communicates with the other components of computer system/server 802 via bus 815. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatically repairing structure cracks, the method comprising:
   mixing a filler material with ferromagnetic dust to create a filler material mixture;

storing each filler material mixture in a filler material reservoir; and creating an array of magnetic coils in the structure, wherein the array of magnetic coils creates a magnetic path through the structure.

2. The method of claim 1, wherein storing each filler material mixture in the filler material reservoir comprises:

identifying one or more materials of a surface of the structure where the crack is located;

determining the filler material that is compatible with the one or more materials; and storing the filler material mixture with the compatible filler material in the filler material reservoir.

3. The method of claim 1, wherein the array of magnetic coils is inside the structure.

4. The method of claim 3, wherein the filler material reservoir is on a surface of the structure.

5. The method of claim 1, wherein creating the array of magnetic coils comprises:

forming a plurality of magnetic coils; and lining up each magnetic coil end to end to form the array of magnetic coils.

6. The method of claim 5, wherein each magnetic coil comprises a metal coil.

7. The method of claim 6, wherein the magnetic coil further comprises a magnet, and wherein the metal coil is wrapped around the magnet.

8. The method of claim 7, wherein arranging the plurality of magnetic coils comprises:

placing the magnetic coils with a southern end of a first magnet from a first magnetic coil next to a northern end of a second magnet of a second magnetic coil.

9. The method of claim 1, wherein the filler material is selected from a group consisting of:

calcium carbonate, silica, epoxy resins, resins, plastic, and adhesive material.

10. The method of claim 1, wherein the filler material is a viscous fluid.

11. An apparatus comprising:

a structure, the structure comprising:

a plurality of filler material reservoirs, wherein each filler material reservoir stores a filler material mixture; and an array of magnetic coils inside the structure.

12. The structure of claim 11, wherein the filler material mixture comprises at least ferromagnetic dust.

13. The structure of claim 12, wherein the filler material mixture further comprises a filler material.

14. The structure of claim 12, wherein the filler material is a viscous fluid.

15. The structure of claim 11, wherein the array of magnetic coils creates a magnetic path through the structure.

16. The structure of claim 11, wherein each magnetic coil in the array of magnetic coils is connected separately with electric current.

17. The structure of claim 11, wherein the array of magnetic coils includes a magnet at each end of each magnetic coil.

18. The structure of claim 11, wherein the structure further comprises:

one or more sensors, wherein the one or more sensors provide information regarding any cracks in the structure.

19. The structure of claim 11, wherein the plurality of filler material reservoirs are on one or more exterior surfaces of the structure.

20. The structure of claim 19, wherein each of the filler material reservoirs are located on a surface of the structure that corresponds with a filler material stored in the filler material reservoir.

* * * * *